United States Patent
Zhao et al.

(10) Patent No.: US 10,689,972 B1
(45) Date of Patent: Jun. 23, 2020

(54) AUTOMATIC DIAGNOSIS METHOD FOR WELLHEAD PRESSURE CURVE OF HYDRAULIC FRACTURING IN SHALE GAS HORIZONTAL WELL

(71) Applicant: Southwest Petroleum University, Chengdu (CN)

(72) Inventors: Jinzhou Zhao, Chengdu (CN); Lan Ren, Chengdu (CN); Ran Lin, Chengdu (CN); Kuidong Li, Chengdu (CN); Yuanzhao Li, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/752,651

(22) Filed: Jan. 26, 2020

(30) Foreign Application Priority Data

May 31, 2019 (CN) .......................... 2019 1 0468722

(51) Int. Cl.
*E21B 47/06* (2012.01)
*G06F 17/18* (2006.01)
*E21B 43/267* (2006.01)
*E21B 49/00* (2006.01)

(52) U.S. Cl.
CPC ............ *E21B 47/06* (2013.01); *E21B 43/267* (2013.01); *E21B 49/00* (2013.01); *G06F 17/18* (2013.01)

(58) Field of Classification Search
CPC ........ E21B 47/06; E21B 43/267; E21B 49/00; G06F 17/18
See application file for complete search history.

(56) References Cited

U.S. PATENT DOCUMENTS

2003/0173079 A1*  9/2003  Chikin .................. E21B 49/008
                                                   166/250.07
2018/0003009 A1*  1/2018  Gilstad ................... E21B 47/00

* cited by examiner

*Primary Examiner* — Bryan Bui
(74) *Attorney, Agent, or Firm* — Ding Yu Tan

(57) ABSTRACT

Dynamic segmentation model to divide bottom hole net pressure curve into different stages based on slope of curve includes: step S1, establish calculation model of bottom hole net pressure: according to wellhead pressure during hydraulic fracturing in shale gas reservoir, calculate bottom hole net pressure based on fluid dynamics theory; step S2, establishing dynamic segmentation model to divide bottom hole net pressure curve into different stages based on slope of curve by numerical analysis theory; step S3, establish recognition model to recognize extension behavior of underground fracture network based on rock mechanics and fracture mechanics; and step S4, combine step S1, S2, and S3 to realize automatic diagnosis for wellhead pressure curve of hydraulic fracturing in shale gas horizontal well. A diagnosis and analysis method of the wellhead pressure curve of hydraulic fracturing in shale gas horizontal well is described.

5 Claims, 4 Drawing Sheets

AUTOMATIC DIAGNOSIS METHOD FOR WELLHEAD PRESSURE CURVE OF HYDRAULIC FRACTURING IN SHALE GAS HORIZONTAL WELL

FIELD OF INVENTION

The present invention relates to the technical field of shale gas development, in particular, to an automatic diagnosis method for wellhead pressure curve of hydraulic fracturing in shale gas horizontal well.

BACKGROUND OF THE INVENTION

Diagnosis for the wellhead pressure curve plays an important role in hydraulic fracturing technology. wellhead pressure can indicate the fracture propagation behavior during hydraulic fracturing. The fracture propagation behavior is closely related to the formation characteristics such as mechanical properties of reservoir rock, properties of the fracturing fluid, geo-stress conditions, and development of natural fractures. Therefore, by analyzing the wellhead pressure curve, hydraulic fracture propagation behavior can be recognized, and formation characteristics can be determined. Consequently, wellhead pressure diagnosis method can be applied to optimize hydraulic fracturing design as well as adjust on-site strategy.

Currently, scholars have mainly researched the characteristics of pressure curves of hydraulic fracturing in unconventional reservoirs. In 1981, Nolte and Smith categorized the logarithmic pressure curve into four typical classifications: I, pressure curve with a slope of about ¼, indicating that the fracture propagate along the length direction, which is a normal pressure curve; II, pressure curve with a slope of about 0, indicating that the natural micro-fractures in the formation might be opened so that the fluid leak-off volume equals to the injection volume, or the pressure exceeds the stress of the overlying formation (vertical stress), forming a T-shaped fracture; III, curve with a slope of about 1, indicating that the fracture propagation is restrained, and the pressure in the fracture rises sharply, and if the slope is higher than 1, indicating that a blockage (proppant screen out) has occurred in the fracture. In this case, appropriate action should be taken immediately to prevent proppant stuck in the wellbore; IV, curve with a negative slope, indicating that the fracture passes through the low geo-stress area, or the natural fractures are activated, increasing the fracturing fluid leakoff remarkably. Subsequently, many other scholars such as Yang Yue (2012) and Qu Guanzheng (2013) further subdivided the logarithmic pressure curve into six subcategories, and explained the pressure drop in the early stages of hydraulic fracturing. Scholars such as Martinez (1993), Fan (1995), Cao Xuejun (2002), Liu Xianling (2003), and Wang Zhengmao (2004) proposed a variety of analysis methods for hydraulic fracturing pressure curve by establishing inversion models for conventional reservoirs. Moreover, Wang Tengfei (2009), Zhang Ye (2014) and other scholars improved the fracturing pressure analysis method based on fractal geometry theory and neural network theory.

In recent years, the shale gas development scale has grown rapidly. However, because of the low porosity and ultra-low permeability of shale gas reservoir, conventional hydraulic fracturing in vertical well is unable to increase production enough to commercially exploit shale gas. Hence, the multi-stage and multi-cluster hydraulic fracturing in horizontal well, aiming at generating complex fractures network in tight but brittle shale formation, was invented and became the primary stimulation method in shale gas reservoir. Due to the strong heterogeneity of shale reservoirs, weaker mechanical structures (natural fractures and bedding fractures), and a large amount of fracturing fluid leakoff, hydraulic fractures usually propagate unevenly and discontinuously, forming complex fractures network. Therefore, the pressure curve of shale gas fracturing is dramatically different from conventional fracturing, it has more complex pattern with more multiple stages. Therefore, the pressure curve diagnosis method for conventional reservoir fracturing cannot be applied to shale gas reservoir fracturing. So far, unfortunately, there is not any specialized pressure curve diagnosis method for shale gas reservoir fracturing.

Thus, establishing a specialized pressure curve diagnosis method for shale gas reservoir fracturing is necessary, it can diagnose the extension behavior of underground fracture network and provide guidance for on-site operation adjustment during hydraulic fracturing to further enhance the recovery of shale gas reservoir.

SUMMARY OF THE INVENTION

In order to solve these problems above, an automatic diagnosis method for wellhead pressure curve of hydraulic fracturing in shale gas horizontal well is provided in the present invention. The purpose of the present invention is to solve the problem of conventional fracturing pressure curve diagnosis method cannot be applied to shale gas hydraulic fracturing due to its complexity and variability.

The technical solution of present invention to solve above technical problems is as follows. An automatic diagnosis method for wellhead pressure curve of hydraulic fracturing in shale gas horizontal well includes steps of:

step S1, establish the calculation model of bottom hole net pressure: according to wellhead pressure during hydraulic fracturing in shale gas reservoir, calculate the bottom hole net pressure based on the fluid dynamics theory, including steps of:

sub-step A: collecting data, include: wellbore parameters, perforation parameters, fracturing parameters, fracturing fluid parameters, proppant parameters, geo-stress conditions, natural fracture parameters, and bedding fracture parameters; and sub-step B: using the data in step A to calculate the fluid flow pressure drop, perforation pressure drop, the static pressure of the proppant-carrying liquid column in wellbore, convert the wellhead pressure to bottom hole net pressure and draw the bottom hole net pressure curve;

step S2, establishing the dynamic segmentation model to divide bottom hole net pressure curve into different stages based on the slope of curve by numerical analysis theory, including steps of:

sub-step a: generate a data sequence of bottom hole net pressure $p_1, p_2, p_3, \ldots, p_N$ and a data sequence of corresponding time $t_1, t_2, t_3, \ldots, t_N$, and extract paired data $\{t_i, p_i\}$ from data sequence successively for calculation;

sub-step b: set the current data in the bottom hole net pressure data sequence and the time data sequence as reference pressure data and reference time data, respectively, i.e., assigning current number to the reference number r;

sub-step c: take the next bottom hole net pressure data and a next time data as the current data, and set the current number as i;

sub-step d: calculate the exponent value, average exponent value, slope value, average slope value, and relative error value of current bottom hole net pressure;

sub-step e: if the relative error value of a current bottom hole net pressure >10%, returning to sub-step b to set current bottom hole net pressure and the current time as the reference bottom hole net pressure and the reference time, i.e., reassigning the reference number r as current number i; if the relative error value of a current bottom hole net pressure ≤10%, returning to sub-step c to continue the calculation of next paired data $\{t_{i+1}, p_{i+1}\}$;

sub-step f: when all the data has been calculated, i.e., i=N, draw the average exponent value of bottom hole net pressure;

step S3, establish the recognition model to recognize the extension behavior of underground fracture based on rock mechanics and fracture mechanics, wherein the fracture extension behavior can be divided into six modes: fractures network extension mode, restrained extension mode, normal extension mode, bedding fracture extension mode, fracture height extension mode, and rapid leakoff mode, and each fracture extension mode corresponds to different pressure curve pattern, establishing a recognition model of fracture extension mode includes following steps:

sub-step I: according to the bottom hole net pressure and average exponent value of bottom hole net pressure to determine fracture extension modes of each time step, then move on to the next time step;

sub-step II: when the last time step has been calculated, stop and output a recognition curve of fracture extension mode; and step S4, combine step S1, S2, and S3 to realize automatic diagnosis for wellhead pressure curve of hydraulic fracturing in shale gas horizontal well.

In one embodiment, the wellbore parameters include wellbore length vertical depth; wellbore diameter, and absolute roughness of wellbore wall; the perforation parameters include perforation number, perforation diameter, and perforation flow coefficient; the fracturing parameters include wellhead pressure, pump rate, and proppant ratio; the fracturing fluid parameters include viscosity and density; the proppant parameter is a proppant density; the geo-stress conditions include minimum horizontal stress, maximum horizontal stress, vertical stress, and stress difference between reservoir layer and adjacent layers; the natural fracture parameters include approach angle, dip angle, cohesion, friction coefficient, and tensile strength; the bedding fracture parameter is tensile strength.

In one embodiment, the fluid flow pressure drop in wellbore is calculated by following formula:

$$\Delta p_{wf} = \lambda \frac{L}{D} \frac{v^2 \rho_1}{2}; \quad (1)$$

where $\Delta p_{wf}$ is the fluid flow pressure drop in wellbore, in Pa; $\lambda$ is the hydraulic friction coefficient, dimensionless; L is the wellbore length, in m; D is the wellbore diameter, in m; v is the fracturing fluid flow velocity, in m/s; $\rho$ is the fracturing fluid density, in kg/m³;

the fracturing fluid flow velocity v is:

$$v = \frac{4q}{\pi D^2}; \quad (2)$$

where q is a fracturing fluid flow rate, i.e., pump rate, in m³/s; the value of hydraulic friction coefficient A is related to the flow state in wellbore;

① when Re<2000, the flow state is laminar, and the hydraulic friction coefficient is:

$$\lambda = 64/Re \quad (3);$$

② when $2000<Re<59.7/\varepsilon^{8/7}$, the flow state is smooth turbulence, and the hydraulic friction coefficient is:

$$\lambda = 0.3164/Re^{0.25} \quad (4);$$

③ when $59.7/\varepsilon^{8/7}<Re<(665-7651\ g\varepsilon)/\varepsilon$, the flow state is frictional turbulence, and the hydraulic friction coefficient is:

$$1/\sqrt{\lambda} = -1.81\ g[6.8/Re + (R/3.7D)^{3.11}] \quad (5);$$

④ when $Re>(665-7651\ g\varepsilon)/\varepsilon$, the flow state is rough turbulence, and the hydraulic friction coefficient is:

$$\lambda = 1/[21\ g(3.7D/R)]^2 \quad (6);$$

where Re is the Reynolds number, dimensionless; E is the relative roughness of wellbore wall, in m; R is an absolute roughness of wellbore wall, in m;

the relative roughness E of wellbore wall and the Reynolds number Re are, respectively:

$$\varepsilon = 2R/D; \quad (7)$$

$$Re = \frac{\rho v D}{\mu}; \quad (8)$$

where $\mu$ is the fracturing fluid viscosity, in Pa·s;

the perforation pressure drop is calculated by following formula:

$$\Delta p_{pf} = 8.1 \frac{q^2 \rho_1}{n_{pf}^2 d_{pf}^4 \alpha_{pf}^2}; \quad (9)$$

where $n_{pf}$ is perforation number; $d_{pf}$ is a perforation diameter, in m; $\alpha$ is a perforation flow coefficient, generally 0.8 to 0.85, dimensionless;

the static pressure of the proppant-carrying liquid column in the wellbore is calculated by following formula:

$$p_{wh} = [(1-V_p)\rho_1 + V_p \rho_p]gZ \quad (10);$$

where $p_{wh}$ is a static pressure of the proppant-carrying liquid column in the wellbore, in Pa; $V_p$ is the proppant ratio, in %; $\rho_p$ is the proppant density, in kg/m³; g is the gravitational acceleration, in m/s²; Z is the wellbore vertical depth, in m;

since the wellbore diameter and the density of the proppant-carrying fluid vary along with wellbore depth, the static stress $p_{wh}$ of the sand-carrying liquid column in wellbore and the fluid flow pressure drop $\Delta p_{wf}$ in wellbore have to be calculated by integrating each differentiation element of pressure drop along the whole wellbore; the bottom hole net pressure is calculated by following formula:

$$p = p_h + \int_0^Z p_{wh} dz - \int_0^L \Delta p_{wf} dl - \Delta p_{pf} - \sigma_{hmin} \quad (11);$$

where p is the bottom hole net pressure, in Pa; $p_h$ is the wellhead pressure, in Pa; $\alpha_{hmin}$ is the minimum horizontal stress of formation, in Pa.

In one embodiment, the exponent value of current bottom hole net pressure is calculated by following formula:

$$n_i = \frac{(p_i - p_{i-1})(t_i - t_r)}{(t_i - t_{i-1})(p_i - p_r)}; \qquad (12)$$

where n is the exponent value of current bottom hole net pressure, dimensionless; p is the bottom hole net pressure, in Pa; t is the time, in s; subscript: i is the sequence number of current bottom hole net pressure and current time, dimensionless; r is the reference number, dimensionless;

the slope value of current bottom hole net pressure is calculated by following formula:

$$k_i = \frac{p_i - p_r}{(t_i - t_r)^{n_i}}; \qquad (13)$$

where k is the slope value of current bottom hole net pressure, in Pa/(s)$^e$;

the average exponent value of current bottom hole net pressure is calculated by following formula:

$$\bar{n}_i = \frac{1}{t_i - t_r} \sum_{r+1}^{i} n_i(t_i - t_{i-1}); \qquad (14)$$

where $\bar{n}$ is the average exponent value of current bottom hole net pressure, dimensionless;

the average slope value of current bottom hole net pressure is calculated by following formula:

$$\bar{k}_i = \frac{1}{t_i - t_r} \sum_{r+1}^{i} k_i(t_i - t_{i-1}); \qquad (15)$$

where $\bar{k}$ is the average slope value of current bottom hole net pressure, in Pa/(s)$^n$;

the relative error value of current bottom hole net pressure is calculated by following formula:

$$\chi_i = \frac{|\bar{k}_i(t_i - t_r)^{n_i} - p_i|}{p_i} \times 100\%; \qquad (16)$$

where $\chi$ is the relative error value of current bottom hole net pressure, dimensionless.

In one embodiment, the recognition equation for the extension mode of fractures network is as follows:

$$\begin{cases} n > 0.3 \\ p > \min\left[(\sigma_{nf} + S_{tnf}), \left(\sigma_{nf} - \frac{\tau_{nf} - \tau_o}{k_{nf}}\right)\right] - \sigma_{hmin}; \end{cases} \qquad (17)$$

where:

$$\begin{cases} \sigma_{nf} = \sigma_{Hmax}\sin^2\theta_{nf}\sin^2\varphi_{nf} + \\ \quad \sigma_{hmin}\cos^2\theta_{nf}\sin^2\varphi_{nf} + \sigma_v\cos^2\varphi_{nf} \\ \tau_{nf} = [(\sin\theta_{nf}\sin\varphi_{nf}\sigma_{Hmax})^2 + \\ \quad (\cos\theta_{nf}\sin\varphi_{nf}\sigma_{hmin})^2 + (\cos\varphi_{nf}\sigma_v)^2 - \\ \quad (\sigma_{Hmax}\sin^2\theta_{nf}\sin^2\varphi_{nf} + \\ \quad \sigma_{hmin}\cos^2\theta_{nf}\sin^2\varphi_{nf} + \sigma_v\cos^2\varphi_{nf})^2]^{0.5} \end{cases} \qquad (18)$$

where $\sigma_v$ is the formation vertical stress, in Pa; $\sigma_{Hmax}$ is the formation maximum horizontal stress, in Pa; $\theta_{nf}$ is the natural fracture approach angle, in °; $\varphi_{nf}$ is the natural fracture dip angle, in °; $S_{tnf}$ is the natural fracture tensile strength, in Pa; $\tau_o$ is the natural fracture cohesion, in Pa; $k_{nf}$ is the natural fracture friction coefficient, dimensionless; $\sigma_{nf}$ is the normal stress value on natural fracture surface, in Pa; $\sigma_\tau$ is the tangential stress value on natural fracture surface, in Pa; $\Delta S$ is the stress difference between the reservoir layer and adjacent layers, in Pa;

the recognition equation for restrained extension mode is as follows:

$$\begin{cases} n > 0.3 \\ p < \min\left[(\sigma_{nf} + S_{tnf}), \left(\sigma_{nf} - \frac{\tau_{nf} - \tau_o}{k_{nf}}\right)\right] - \sigma_{hmin}; \end{cases} \qquad (19)$$

the recognition equation for normal extension mode is as follows:

$$\begin{cases} 0.2 < n < 0.3 \\ p > 0 \end{cases}; \qquad (20)$$

the recognition equation for bedding fracture extension mode is as follows:

$$\begin{cases} -0.2 < n < 0.2 \\ p > \sigma_v - \sigma_{hmin} + S_{tbp} \end{cases}; \qquad (21)$$

where $S_{tbp}$ is the bedding fracture tensile strength, in Pa;
the recognition equation for fracture height extension mode is as follows:

$$\begin{cases} n < 0.2 \\ p > \Delta S \end{cases}; \qquad (22)$$

the recognition equation for rapid leakoff mode is as follows:

$$\begin{cases} n < 0.2 \\ p < \Delta S \end{cases}. \qquad (23)$$

In one embodiment, the numerical calculation process of step S4 includes steps of:

step S901, input parameters: wellbore parameters, perforation parameters, fracturing parameters, fracturing fluid parameters, proppant parameters, geo-stress conditions, natural fracture parameters, and bedding fracture parameters;

step S902, calculate the fluid flow pressure drop, perforation pressure drop, and static pressure of the proppant-carrying liquid column in wellbore; convert the wellhead pressure to the bottom hole net pressure;

step S903, establish the bottom hole net pressure data sequence and the time data sequence; generate the bottom hole net pressure curve and divide it into different stages based on dynamic segmentation model, and calculate the average exponent value of bottom hole net pressure;

step S904, automatically recognize the fractures network extension mode of each stage based on the bottom hole net pressure and its average exponent value;

step S905, output data: the bottom hole net pressure value, average exponent value of current bottom hole net pressure, and the fractures network extension mode;

and step S906, draw the diagnosis result diagram, which includes four curves: wellhead pressure curve, bottom hole net pressure curve, average exponent value curve, and fractures network extension mode recognition curve.

The present invention has following beneficial effects: compared with current technology, the method in present invention fully considers the geological condition of shale gas reservoir and characteristics of multi-stage multi-cluster hydraulic fracturing technology, it establishes a calculation model of bottom hole net pressure, a dynamic segmentation model of bottom hole net pressure, and a fractures network extension mode recognition model, thereby proposes an automatic diagnosis method for wellhead pressure curve of hydraulic fracturing in shale gas horizontal well. Because the method of the present invention comprehensively and systematically considers the influence of six typical modes of fractures network extension on wellhead pressure hydraulic fracturing in shale gas horizontal well, the wellhead pressure curve can be diagnosed automatically, quickly, and accurately. the problem that there is no specialized diagnosis method for complex pressure curve of shale gas fracturing can be solved by the present invention.

BRIEF DESCRIPTION OF THE DRAWINGS

In order to more clearly illustrate the technical scheme of present invention embodiment, relevant figures of embodiment example are introduced in detail as follows. It is worth noting that, in accordance with the standard practice in the industry, various features are not drawn to scale. In fact, the dimensions of the various features may be arbitrarily increased or reduced for clarity of discussion.

DESCRIPTION OF THE PREFERRED EMBODIMENTS

Figure 1:
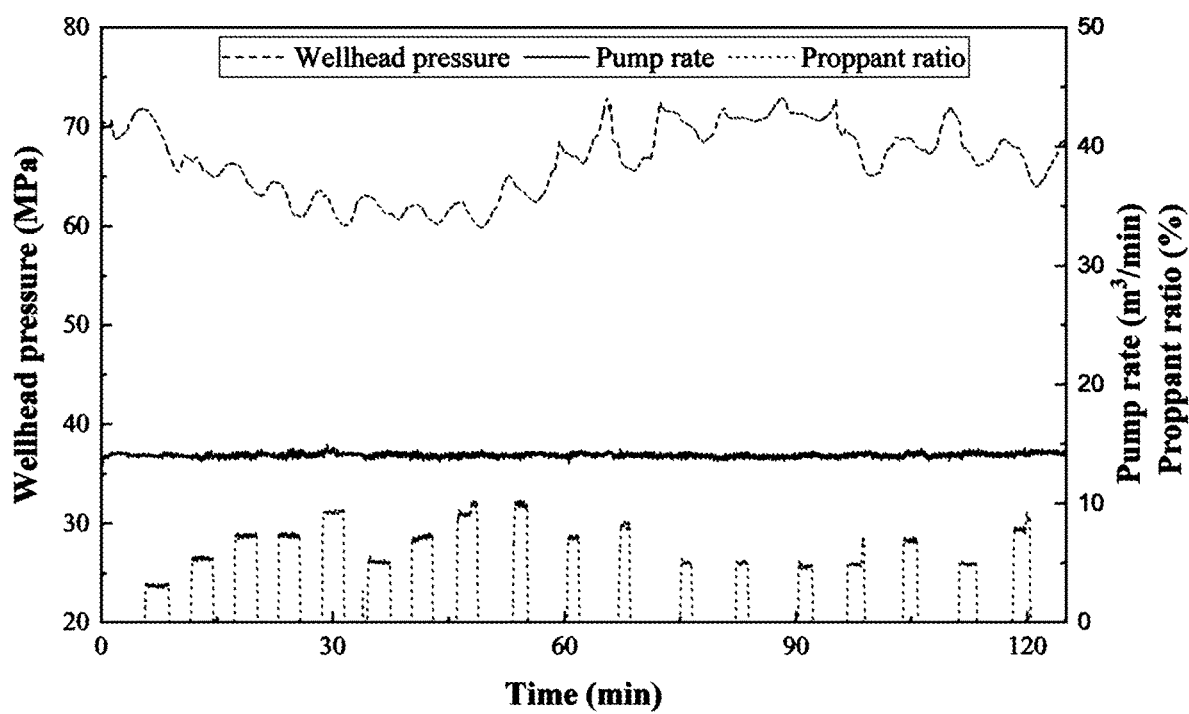
FIG. 1 is an on-site hydraulic fracturing treatment plot of a horizontal shale gas well of the present invention.

The following invention provides different embodiment, or examples, for implementing different features of the provided subject matter. Specific examples of components and arrangements are described below to simplify the present invention. These are, of course, merely examples and are not intended to be limiting. For example, the formation of a first feature over or on a second feature in the description that follows may include embodiment in which the first and second features are formed in direct contact, and may also include embodiment in which additional features may be formed between the first and second features, such that the first and second features may not be in direct contact. In addition, the present invention may repeat reference numerals and/or letters in the various examples. This repetition is for the purpose of simplicity and clarity and does not in itself dictate a relationship between the various embodiment and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present invention will be further elaborated hereafter in connection with the drawings and embodiments.

As shown in FIGS. 1 to 6, an automatic diagnosis method for wellhead pressure curve of hydraulic fracturing in shale gas horizontal well includes the following steps. The geological and engineering parameters of an actual shale gas reservoir are shown in Table 1:

TABLE 1

| The geological and engineering parameters of an actual shale gas reservoir | | |
|---|---|---|
| Parameter name | Value | Unit |
| Wellbore diameter | 0.2 | m |
| Absolute roughness of wellbore wall | 0.05 | mm |
| Perforation number | 20 | piece |
| Perforation diameter | 9.5 | mm |
| Perforation flow coefficient | 0.85 | |
| Fracturing fluid viscosity | 10 | mPa · s |
| Fracturing fluid density | 1000 | kg/m$^3$ |
| Proppant density | 2650 | kg/m$^3$ |
| Minimum horizontal stress | 50.2 | MPa |
| Maximum horizontal stress | 56.4 | MPa |
| Vertical stress | 60.5 | MPa |
| Stress difference between reservoir and adjacent layers | 7.01 | MPa |
| Natural fracture approachangle | 87 | ° |
| Natural fracture dip angle | 11 | ° |
| Natural fracture cohesion | 2 | MPa |
| Natural fracture friction coefficient | 0.4 | |
| Natural fracture tensile strength | 1 | MPa |
| Bedding fracture tensile strength | 1 | MPa |

The on-site hydraulic fracturing treatment plot of a horizontal shale gas well is shown in FIG. 1, and the wellbore parameters are shown in Table 2.

TABLE 2

| Wellbore parameters | | |
|---|---|---|
| Well depth (m) | Vertical depth (m) | Inclination Angle (°) |
| 0 | 0 | 0 |
| 1122 | 1000 | 26.98 |
| 3020 | 2691.58 | 26.98 |
| 3200 | 2700.31 | 87.26 |

TABLE 2-continued

Wellbore parameters

| Well depth (m) | Vertical depth (m) | Inclination Angle (°) |
|---|---|---|
| 3770 | 2661.265 | 93.98 |
| 4520 | 2631.95 | 92.29 |

Figure 2:
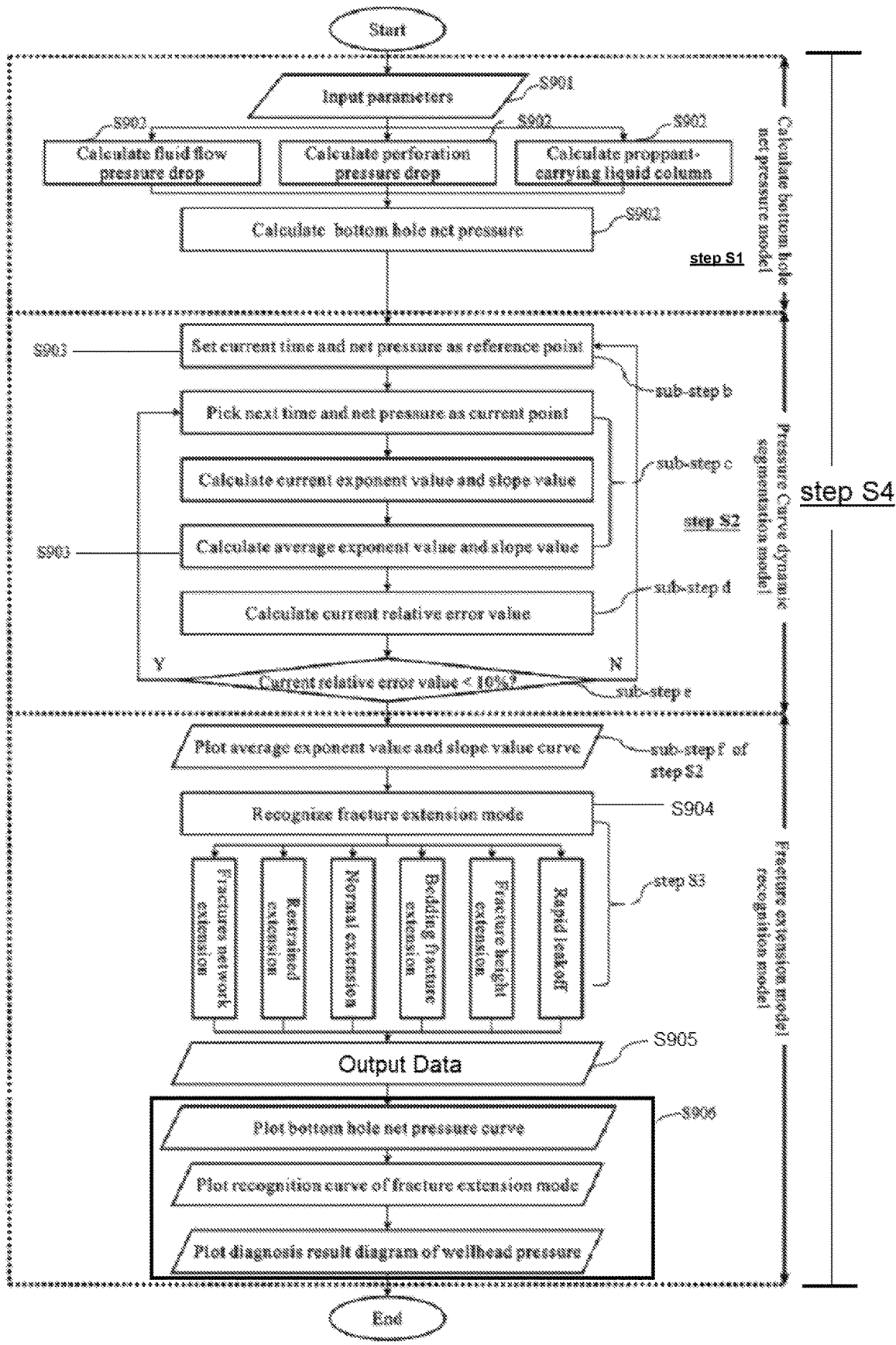
FIG. 2 is a calculation process flowchart of the diagnosis method in the present invention.

Calculations for some embodiments are performed according to the calculation processes of a method of the present invention (as shown in FIG. 2).

Step S1, establish the calculation model of bottom hole net pressure for calculating the bottom hole net pressure according to the wellhead pressure during hydraulic fracturing in shale gas reservoir.

Specifically:

① use formulas (1) to (8) to calculate the fluid flow pressure drop in the wellbore;

② use formula (9) to calculate the perforation pressure drop;

③ use formula (10) to calculate the static pressure of the proppant-carrying liquid column; ④ use formula (11) to calculate the bottom hole net pressure, and plot the bottom hole net pressure curve.

Figure 3:
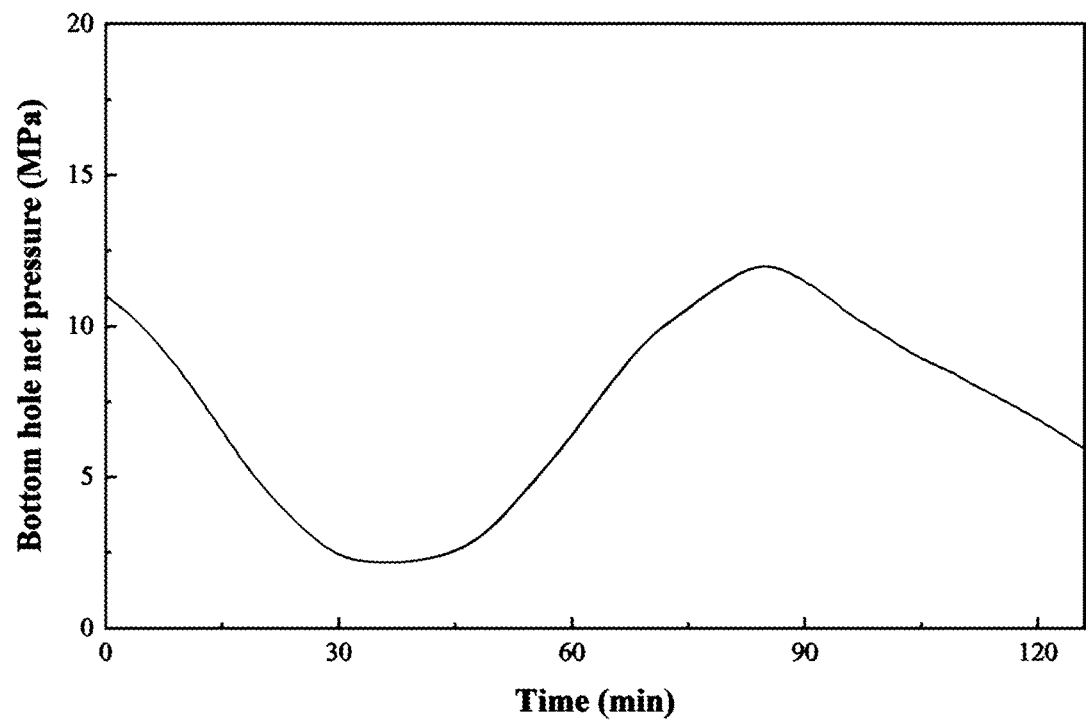
FIG. 3 is a bottom hole net pressure curve of the present invention.

Based on the calculation model of bottom hole net pressure, the calculated bottom hole net pressure curve is shown in FIG. 3.

Step S2, establishing a dynamic fitting model of bottom hole net pressure using numerical analysis theory for calculating the bottom hole net pressure index average to provide a basis for the fracture extension mode recognition in the next step establishing the dynamic segmentation model for dividing the bottom hole net pressure curve into different stages and calculating the average exponent value of current bottom hole net pressure, providing the basis for fractures network extension mode recognition in the next step.

Figure 4:
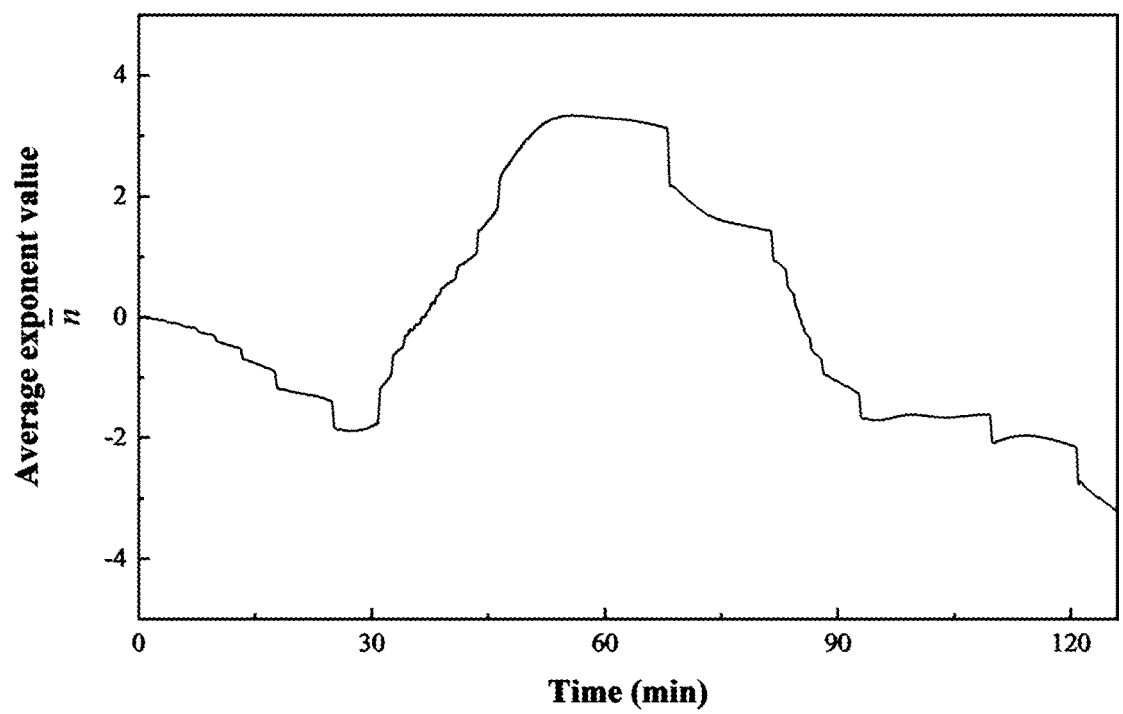
FIG. 4 is an average exponent value curve of current bottom hole net pressure of the present invention.

Specifically:

a, generate a data sequence of bottom hole net pressure $p_1$, $p_2$, $p_3$, . . . , $p_N$ and a data sequence of corresponding time $t_1$, $t_2$, $t_3$, . . . , $t_N$, and extract paired data $\{t_i, p_i\}$ from data sequence successively for calculation;

b, set the current data in the bottom hole net pressure data sequence and the time data sequence as reference pressure data and reference time data, respectively, i.e., assigning current number to the reference number r;

c, take the next bottom hole net pressure data and a next time data as the current data, and set the current number as i;

d, calculate the exponent value, average exponent value, slope value, average slope value, and relative error value of current bottom hole net pressure;

e, if the relative error value of a current bottom hole net pressure >10%, returning to sub-step b to set current bottom hole net pressure and the current time as the reference bottom hole net pressure and the reference time, i.e., reassigning the reference number r as current number i; if the relative error value of a current bottom hole net pressure ≤10%, returning to sub-step c to continue the calculation of next paired data $\{t_{i+1}, p_{i+1}\}$;

f, when all the data has been calculated, i.e., i=N, draw the average exponent value of bottom hole net pressure. Based on the dynamic segmentation model, the calculated average exponent value of current bottom hole net pressure is shown in FIG. 4.

Step S3, establish the recognition model for recognizing the extension behavior of underground fracture network based on the bottom hole net pressure and its average exponent value.

Specifically:

① calculate the bottom hole net pressure and the its average exponent value data sequences successively;

② determine whether the criterion equation (17) is satisfied, and if yes, recognize the fracture extension mode as fractures network extension mode, then continue to process the next data point;

③ determine whether the criterion equation (19) is satisfied, and if yes, recognize the fracture extension mode as restrained extension mode, then continue to process the next data point;

④ determine whether the criterion equation (20) is satisfied, and if yes, recognize the fracture extension mode as normal extension mode, then continue to process the next data point;

⑤ determine whether the criterion equation (21) is satisfied, and if yes, recognize the fracture extension mode as bedding fracture extension mode, then continue to process the next data point;

⑥ determine whether the criterion equation (22) is satisfied, and if yes, recognize the fracture extension mode as fracture height extension mode, then continue to process the next data point;

⑦ determine whether the criterion equation (23) is satisfied, and if yes, recognize the fracture extension mode as a rapid leakoff mode, then continue to process the next data point;

⑧ when all the data points have been processed, stop the calculation, and output the fracture extension mode recognition curve.

Figure 5:
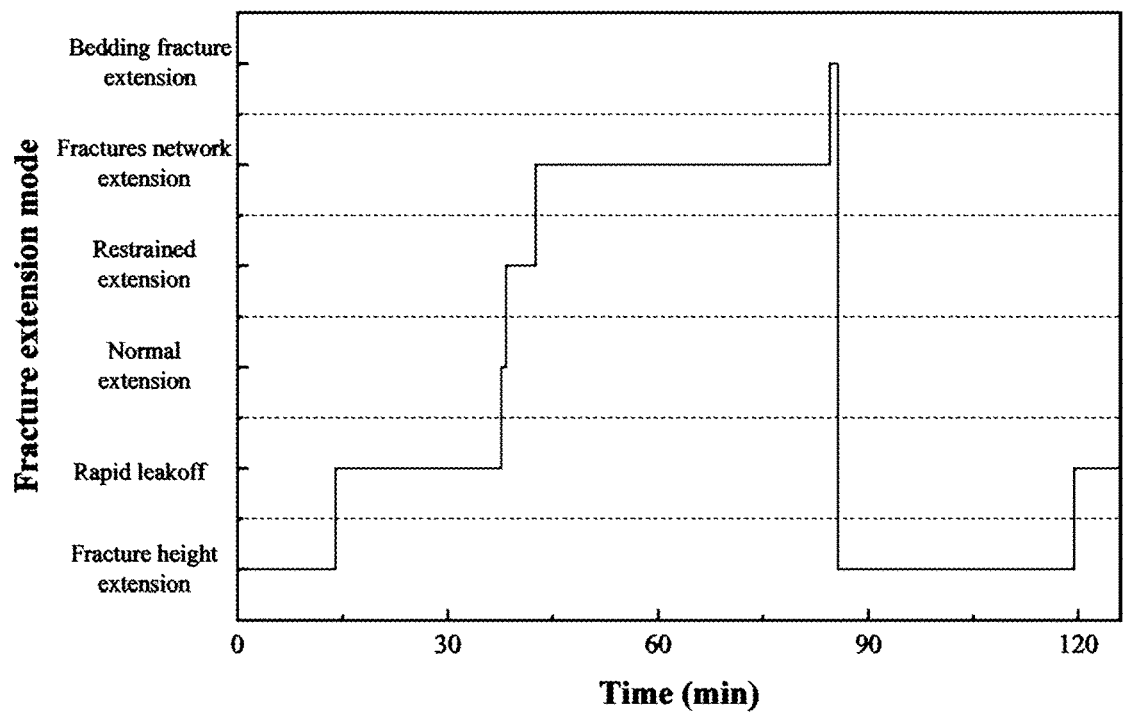
FIG. 5 is a fractures network extension mode recognition curve of the present invention.

Determining the fracture extension modes of different stages in the shale fracture network fracturing process based on the fracture extension mode recognition model is shown in Table 3 based on the recognition model, the fracture extension modes during hydraulic fracturing in shale gas horizontal well are recognized and listed in Table 3, and the fracture extension mode recognition curve is shown in FIG. 5.

TABLE 3

Fracture extension mode table

| Stage | Time (min) Start | End | Fracture extension mode |
|---|---|---|---|
| 1 | 0 | 14 | Fracture height extension mode |
| 2 | 14 | 37 | Rapid leakoff mode |
| 3 | 37 | 38 | Normal extension mode |
| 4 | 38 | 43 | Restrained extension mode |
| 5 | 43 | 85 | Fractures network extension mode |
| 6 | 85 | 86 | Bedding fracture extension mode |
| 7 | 86 | 119 | Fracture height extension mode |
| 8 | 119 | 126 | Rapid leakoff mode | step S4, combine step S1, S2, and S3 to realize automatic diagnosis for wellhead pressure curve of hydraulic fracturing in shale gas horizontal well.

Figure 6:
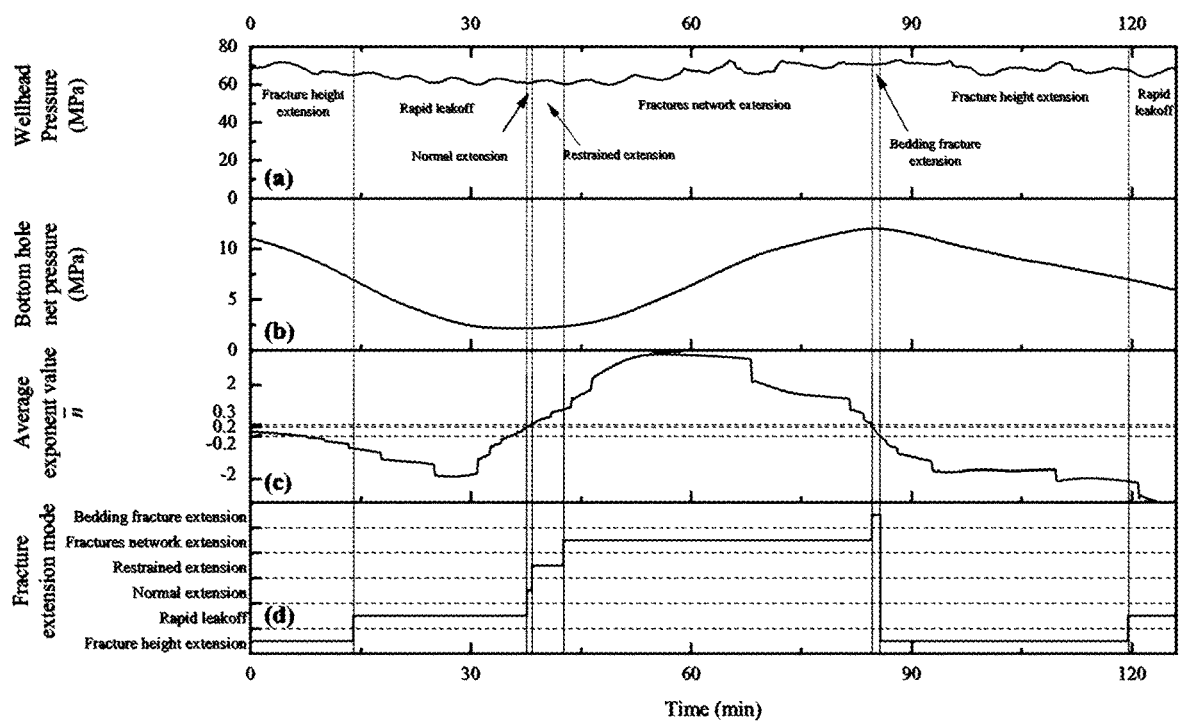
FIG. 6 is a diagnosis result diagram of wellhead pressure of shale gas fracturing of the present invention.

Based on the calculation process and results above, the diagnosis result diagram of wellhead pressure of shale gas fracturing is drawn, as shown in FIG. 6. It shows that, during the hydraulic fracturing in this horizontal shale gas well, the fracturing pressure curve can be divided into eight stages with different fracture extension modes: Fracture height extension, rapid leakoff, Normal extension, extension resistance, fractures network extension, bedding fracture extension, fracture height extension, and rapid leakoff. For shale gas reservoir fracturing, both fractures network extension and bedding fracture extension are beneficial to generate complex fractures network. In this example, the time of fractures network extension and bedding fracture extension stages is 43 minutes, accounting for 34.13% of the total fracturing time.

In one embodiment of the present invention, the wellbore parameters include wellbore length vertical depth; wellbore diameter, and absolute roughness of wellbore wall; the perforation parameters include perforation number, perforation diameter, and perforation flow coefficient; the fracturing parameters include wellhead pressure, pump rate, and proppant ratio; the fracturing fluid parameters include viscosity and density; the proppant parameter is a proppant density; the geo-stress conditions include minimum horizontal stress, maximum horizontal stress, vertical stress, and stress difference between reservoir layer and adjacent layers; the natural fracture parameters include approach angle, dip angle, cohesion, friction coefficient, and tensile strength; the bedding fracture parameter is tensile strength.

In one embodiment of the present invention, the fluid flow stress drop in wellbore is calculated using the following formula:

$$\Delta p_{wf} = \lambda \frac{L}{D} \frac{v^2 \rho_1}{2}; \tag{1}$$

wherein $\Delta p_{wf}$ is the fluid flow stress drop in wellbore, in Pa; $\lambda$ is a hydraulic friction coefficient, no factor; L is a wellbore length, in m; D is a wellbore diameter, in m; v is a fracturing fluid flow velocity, in m/s; $\rho$ is a fracturing fluid density, in kg/m³;

the fracturing fluid flow velocity v is:

$$v = \frac{4q}{\pi D^2}; \tag{2}$$

wherein q is a fracturing fluid flow, i.e., a pump displacement, in m³/s;

a value of the hydraulic friction coefficient A is related to a flow state of a pipe flow;

① when Re<2000, the flow state is laminar, and the hydraulic friction coefficient is:

$$\lambda = 64/Re \tag{3};$$

② when $2000<Re<59.7/\varepsilon^{8/7}$, the flow state is hydraulic smooth turbulence, and the hydraulic friction coefficient is:

$$\lambda = 0.3164/Re^{0.25} \tag{4};$$

③ when $59.7/\varepsilon^{8/7}<Re<(665-7651\ g\varepsilon)/\varepsilon$, the flow state is mixed friction turbulence, and the hydraulic friction coefficient is:

$$1/\sqrt{\lambda} = -1.81\ g[6.8/Re+(R/3.7D)^{3.11}] \tag{5};$$

④ when $Re>(665-7651\ g\varepsilon)/\varepsilon$, the flow state is rough turbulence, and the hydraulic friction coefficient is:

$$\lambda = 1/[21\ g(3.7D/R)]^2 \tag{6};$$

wherein Re is a Reynolds number, no factor; $\varepsilon$ is a relative roughness of wellbore wall, in m; R is an absolute roughness of wellbore wall, in m;

the relative roughness E of wellbore wall and the Reynolds number Re are, respectively:

$$\varepsilon = 2R/D; \tag{7}$$

$$Re = \frac{\rho v D}{\mu}; \tag{8}$$

wherein $\mu$ is a fracturing fluid viscosity, in Pa·s;

the perforation stress drop is calculated using the following formula:

$$\Delta p_{pf} = 8.1 \frac{q^2 \rho_1}{n_{pf}^2 d_{pf}^4 \alpha_{pf}^2}; \tag{9}$$

wherein $n_{pf}$ is a perforation number; $d_{pf}$ is a perforation diameter, in m; $\alpha$ is a Perforation flow coefficient, generally 0.8 to 0.85, no factor;

the static stress of the sand-carrying liquid column in the wellbore is calculated using the following formula:

$$p_{wh} = [(1-V_p)\rho_1 + V_p \rho_p]gZ \tag{10};$$

wherein $p_{wh}$ is a static stress of the sand-carrying liquid column in the wellbore, in Pa; $V_p$ is a proppant ratio, in %; $\rho_p$ is a proppant density, in kg/m³; g is a gravitational acceleration, in m/s²; Z is a wellbore vertical depth, in m;

since the wellbore diameter and the density of the sand-carrying fluid vary with the wellbore depth, the static stress $p_{wh}$ of the sand-carrying liquid column in wellbore and the fluid flow stress drop $\Delta p_{wf}$ in wellbore have to be calculated by subjecting the vertical depth and length of the wellbore separately to microelement calculation and integration; the bottom hole net pressure is calculated using the following formula:

$$p = p_h + \int_0^Z p_{wh} dz - \int_0^L \Delta p_{wf} dl - \Delta p_{pf} - \sigma_{hmin} \tag{11};$$

wherein p is the bottom hole net pressure, in Pa; $p_h$ is the wellhead stress, in Pa; $\sigma_{hmin}$ is the minimum horizontal principal stress of formation, in Pa.

In one embodiment of the present invention, the bottom hole net pressure index fit value is calculated using the following formula:

$$n_i = \frac{(p_i - p_{i-1})(t_i - t_r)}{(t_i - t_{i-1})(p_i - p_r)}; \tag{12}$$

wherein n is the net pressure index fit value, no factor; p is the bottom hole net pressure, in Pa; t is the time, in s; subscript: i is a current bottom hole net pressure and a current time data number, no factor; r is a number of the reference bottom hole net pressure data and the reference time data, no factor;

the net pressure slope fit value is calculated using the following formula:

$$k_i = \frac{p_i - p_r}{(t_i - t_r)^{n_i}}; \tag{13}$$

wherein k is the net pressure slope fit value, in Pa/(s)$^e$;

the net pressure index average is calculated using the following formula:

$$\bar{n}_i = \frac{1}{t_i - t_r} \sum_{r+1}^{i} n_i(t_i - t_{i-1}); \quad (14)$$

wherein $\bar{n}$ is the net pressure index average, no factor;

the net pressure slope average is calculated using the following formula:

$$\bar{k}_i = \frac{1}{t_i - t_r} \sum_{r+1}^{i} k_i(t_i - t_{i-1}); \quad (15)$$

wherein $\bar{k}$ is the net pressure slope average, in Pa/(s)$^n$;

the net pressure index fit relative error value is calculated using the following formula:

$$\chi_i = \frac{\left| \bar{k}_i(t_i - t_r)^{n_i} - p_i \right|}{p_i} \times 100\%; \quad (16)$$

wherein $\chi$ is the net pressure index fit relative error value, no factor.

In one embodiment of the present invention, a recognition equation for the fracture network extension mode is as follows:

$$\begin{cases} n > 0.3 \\ p > \min\left[ (\sigma_{nf} + S_{tnf}), \left( \sigma_{nf} - \frac{\tau_{nf} - \tau_o}{k_{nf}} \right) \right] - \sigma_{hmin} \end{cases}; \quad (17)$$

wherein:

$$\begin{cases} \sigma_{nf} = \sigma_{Hmax}\sin^2\theta_{nf}\sin^2\varphi_{nf} + \\ \quad \sigma_{hmin}\cos^2\theta_{nf}\sin^2\varphi_{nf} + \sigma_v\cos^2\varphi_{nf} \\ \tau_{nf} = [(\sin\theta_{nf}\sin\varphi_{nf}\sigma_{Hmax})^2 + \\ \quad (\cos\theta_{nf}\sin\varphi_{nf}\sigma_{hmin})^2 + (\cos\varphi_{nf}\sigma_v)^2 - \\ \quad (\sigma_{Hmax}\sin^2\theta_{nf}\sin^2\varphi_{nf} + \\ \quad \sigma_{hmin}\cos^2\theta_{nf}\sin^2\varphi_{nf} + \sigma_v\cos^2\varphi_{nf})^2]^{0.5} \end{cases} ; \quad (18)$$

wherein $\sigma_v$ is a formation vertical stress, in Pa; $\sigma_{Hmax}$ is a formation maximum horizontal principal stress, in Pa; $\theta_{nf}$ is a formation natural fracture approach angle, in °; $\varphi_{nf}$ is a formation natural fracture inclination, in °; $S_{tnf}$ is a formation natural fracture tensile strength, in Pa; $\tau_o$ is a formation natural fracture cohesion, in Pa; $k_{nf}$ is a formation natural fracture friction coefficient, no factor; $\sigma_{nf}$ is a normal stress value withstood by the formation natural fracture wall surface, in Pa; $\sigma_\tau$ is a tangential stress value withstood by the formation natural fracture wall surface, in Pa; $\Delta S$ is a stress difference between the reservoir and the upper and lower compartments, in Pa;

a recognition equation for the extension resistance mode is as follows:

$$\begin{cases} n > 0.3 \\ p < \min\left[ (\sigma_{nf} + S_{tnf}), \left( \sigma_{nf} - \frac{\tau_{nf} - \tau_o}{k_{nf}} \right) \right] - \sigma_{hmin} \end{cases}; \quad (19)$$

a recognition equation for the normal extension mode is as follows:

$$\begin{cases} 0.2 < n < 0.3 \\ p > 0 \end{cases}; \quad (20)$$

a recognition equation for the bedding fracture extension mode is as follows:

$$\begin{cases} -0.2 < n < 0.2 \\ p > \sigma_v - \sigma_{hmin} + S_{tbp} \end{cases}; \quad (21)$$

wherein $S_{tnf}$ is a bedding fracture tensile strength, in Pa;

a recognition equation for the Fracture height extension mode is as follows:

$$\begin{cases} n < 0.2 \\ p > \Delta S \end{cases}; \quad (22)$$

a recognition equation for the rapid filtration mode is as follows:

$$\begin{cases} n < 0.2 \\ p < \Delta S \end{cases}. \quad (23)$$

In one embodiment of the present invention, the numerical calculation process of step S4 includes steps of:

step S901, inputting parameters: wellbore structure parameters, wellbore parameters, perforation parameters, fracturing construction parameters, fracturing fluid parameters, proppant parameters, in-situ stress conditions, natural fracture parameters, and bedding fracture parameters;

step S902, calculating a fluid flow stress drop, a perforation stress drop, and a static stress of the sand-carrying liquid column in wellbore; converting the fracturing construction wellhead stress into the bottom hole net pressure;

step S903, establishing a bottom hole net pressure data sequence and a time data sequence; performing dynamic fitting of the bottom hole net pressure and calculating the net pressure index average;

step S904, automatically recognizing the fracture extension mode corresponding to each stage based on the bottom hole net pressure and the net pressure index average;

step S905, outputting data: the bottom hole net pressure value, the net pressure index average, and the fracture extension mode; and step S906, drawing an image: a bottom hole net pressure curve, a net pressure index average curve, a fracture extension mode recognition curve, and a diagnosis diagram of construction pressure curve.

The present invention has the following beneficial effects: compared with the existing technology, the method of the present invention specifically targets the characteristics of shale gas reservoirs and combines the fracturing technology characteristics of shale gas fracture network to establish a conversion model for bottom hole net pressure of shale gas fracture network, a dynamic fitting model of bottom hole net pressure, and a fracture extension mode recognition model, thereby proposing an automatic diagnosis method for construction pressure curve of shale gas fracture network.

Since the method of the present invention comprehensively and systematically considers the effect of six common fracture extension modes during shale gas fracture network fracturing process on the construction pressure, the construction pressure curve of shale gas fracture network can be automatically, quickly, and accurately diagnosed and analyzed. The problem that the characteristics of construction pressure curve of shale gas fracture network are complex and changeable, and there is no targeted diagnosis method for construction pressure curve can be solved.

What is described above is only the preferred embodiments of the present invention but does not limit the present invention in any form. The preferred embodiments are used to disclose the present invention as above but not to limit the present invention. Those skilled in the art may utilize the disclosed technical contents to make some alterations and modifications as equivalent embodiments of equal changes without departing form the scope of the technical scheme of the present invention and any simple alterations, equivalent changes and modifications made according to the technical essence of the present invention without departing from the technical contents of the present invention should be contained in the scope of the technical scheme of the present invention.

What is claimed is:

1. An automatic diagnosis method for wellhead pressure curve of hydraulic fracturing in shale gas horizontal well, includes steps of:
    step S1, establishing a conversion model for bottom hole net pressure of shale gas fracture network using fluid dynamics theory, comprising steps of:
        sub-step A: collecting data, comprising: wellbore structure parameters, wellbore parameters, perforation parameters, fracturing construction parameters, fracturing fluid parameters, proppant parameters, in-situ stress conditions, natural fracture parameters, and bedding fracture parameters;
        sub-step B: using the data in step A to calculate a fluid flow stress drop, a perforation stress drop, a static stress of the sand-carrying liquid column and a bottom hole net pressure, and drawing a bottom hole net pressure curve;
    step S2, establishing a dynamic fitting model of bottom hole net pressure using numerical analysis theory, comprising steps of:
        sub-step a: establishing a bottom hole net pressure data sequence $p_1, p_2, p_3 3, \ldots, p_N$ and a corresponding time data sequence $t_1, t_2, t_3 3, \ldots, t_N$, and extracting the bottom hole net pressure data sequence and the corresponding time data sequence from 1 to N in turn for calculation;
        sub-step b: setting the current data in the bottom hole net pressure data sequence and the time data sequence as reference pressure data and reference time data, respectively, for assigning a reference number r to the current number;
        sub-step c: taking a next bottom hole net pressure data and a next time data as the current data, and setting the current number to i;
        sub-step d: calculating a current bottom hole net pressure index fit value and a slope fit value, a bottom hole current net pressure index average and a slope average, and a bottom hole current net pressure index fit relative error value;
        sub-step e: if the current bottom hole net pressure index fit relative error value >10%, returning to sub-step b to set the current bottom hole net pressure and the current time to the reference bottom hole net pressure and the reference time for reassigning the reference number r to the current number i; if the current bottom hole net pressure index fit relative error value ≤10%, returning to sub-step c to continue the calculation of next data;
        sub-step f: when all the data has been calculated, and i=N, drawing a bottom hole net pressure index average curve;
    step S3, establishing a fracture extension mode recognition model using fracture extension theory, wherein the fracture extension modes comprises fracture network extension mode, extension resistance mode, normal extension mode, bedding network extension mode, Fracture height extension mode, and rapid filtration mode, and each mode corresponds to different pressure curve feature recognition equations, the step of establishing a fracture extension mode recognition model comprising steps of:
        sub-step I: using the bottom hole net pressure and the net pressure index average data sequence to determine whether the fracture extension modes are in turn the fracture network extension mode, the extension resistance mode, the normal extension mode, the bedding network extension mode, the Fracture height extension mode, and the rapid filtration mode, and determining the next data point if the data satisfies one of the modes;
        sub-step II: when all the data points have been treated, stopping the calculation, and outputting a fracture extension mode recognition curve; and
    step S4, combining steps S1, S2, and S3 to realize automatic diagnosis for construction stress curve of shale gas fracture network through numerical calculation processes to recognize hydraulic fracture propagation behavior and guiding changes in on-site operation adjustment by assessing occurrence of propagation restraining, proppant blockage and fracturing leakoff risk, wherein the numerical calculation process of the step S4 comprising steps of:
        sub-step S901, inputting parameters in the step S1: the wellbore structure parameters, the wellbore parameters, the perforation parameters, the fracturing construction parameters, the fracturing fluid parameters, the proppant parameters, the in-situ stress conditions, the natural fracture parameters, and the bedding fracture parameters;
        sub-step S902, calculating the fluid flow stress drop, the perforation stress drop, and the static stress of the sand-carrying liquid column in the step S1; and converting a fracturing construction wellhead pressure into the bottom hole net pressure;
        sub-step S903, establishing the bottom hole net pressure data sequence and the time data sequence in the step S2; performing dynamic fitting of the bottom hole net pressure and calculating the bottom hole net pressure index average;

sub-step S904, automatically recognizing the fracture extension mode corresponding to each stage based on the bottom hole net pressure and the bottom hole net pressure index average in the step S3;

sub-step S905, outputting data: the bottom hole net pressure, the bottom hole net pressure index average, and the fracture extension mode; and sub-step S906, drawing an image: the bottom hole net pressure curve, the bottom hole net pressure index average curve, the fracture extension mode recognition curve, and a diagnosis diagram of construction pressure curve.

2. The automatic diagnosis method for wellhead pressure curve of hydraulic fracturing in shale gas horizontal well according to claim 1, wherein the wellbore parameters include wellbore length vertical depth; wellbore diameter, and absolute roughness of wellbore wall; the perforation parameters include perforation number, perforation diameter, and perforation flow coefficient; the fracturing parameters include wellhead pressure, pump rate, and proppant ratio; the fracturing fluid parameters include viscosity and density; the proppant parameter is a proppant density; the geo-stress conditions include minimum horizontal stress, maximum horizontal stress, vertical stress, and stress difference between reservoir layer and adjacent layers; the natural fracture parameters include approach angle, dip angle, cohesion, friction coefficient, and tensile strength; the bedding fracture parameter is tensile strength.

3. The automatic diagnosis method for wellhead pressure curve of hydraulic fracturing in shale gas horizontal well according to claim 1, wherein the fluid flow stress drop in wellbore is calculated using the following formula:

$$\Delta p_{wf} = \lambda \frac{L}{D} \frac{v^2 \rho_1}{2}; \quad (1)$$

wherein $\Delta p_{wf}$ is the fluid flow stress drop in wellbore, in Pa; $\lambda$ is a hydraulic friction coefficient, no factor; L is a wellbore length, in m; D is a wellbore diameter, in m; v is a fracturing fluid flow velocity, in m/s; $\rho$ is a fracturing fluid density, in kg/m³;

the fracturing fluid flow velocity v is:

$$v = \frac{4q}{\pi D^2}; \quad (2)$$

wherein q is a fracturing fluid flow, i.e., a pump displacement, in m³/s;

a value of the hydraulic friction coefficient $\lambda$ is related to a flow state of a pipe flow;

① when Re<2000, the flow state is laminar, and the hydraulic friction coefficient is:

$$\lambda = 64/Re \quad (3);$$

② when 2000<Re<59.7/$\varepsilon^{8/7}$, the flow state is hydraulic smooth turbulence, and the hydraulic friction coefficient is:

$$\lambda = 0.3164/Re^{0.25} \quad (4);$$

③ when 59.7/$\varepsilon^{8/7}$<Re<(665-7651 g$\varepsilon$)/$\varepsilon$, the flow state is mixed friction turbulence, and the hydraulic friction coefficient is:

$$1/\sqrt{\lambda} = -1.81 \, g[6.8/Re+(R/3.7D)^{3.11}] \quad (5);$$

④ when Re>(665-7651 g$\varepsilon$)/$\varepsilon$, the flow state is rough turbulence, and the hydraulic friction coefficient is:

$$\lambda = 1/[21 \, g(3.7D/R)]^2 \quad (6);$$

wherein Re is a Reynolds number, no factor; $\varepsilon$ is a relative roughness of wellbore wall, in m; R is an absolute roughness of wellbore wall, in m;

the relative roughness E of wellbore wall and the Reynolds number Re are, respectively:

$$\varepsilon = 2R/D \quad (7);$$

$$Re = \frac{\rho v D}{\mu}; \quad (8)$$

wherein $\mu$ is a fracturing fluid viscosity, in Pa·s;

the perforation stress drop is calculated using the following formula:

$$\Delta p_{pf} = 8.1 \frac{q^2 \rho_1}{n_{pf}^2 d_{pf}^4 \alpha_{pf}^2}; \quad (9)$$

wherein $n_{pf}$ is a perforation number; $d_{pf}$ is a perforation diameter, in m; $\alpha$ is a Perforation flow coefficient, generally 0.8 to 0.85, no factor;

the static stress of the sand-carrying liquid column in the wellbore is calculated using the following formula:

$$p_{wh} = [(1-V_p)\rho_1 + V_p \rho_p]gZ \quad (10);$$

wherein $p_{wh}$ is a static stress of the sand-carrying liquid column in the wellbore, in Pa; $V_p$ is a proppant ratio, in %; $\rho_p$ is a proppant density, in kg/m³; g is a gravitational acceleration, in m/s²; Z is a wellbore vertical depth, in m;

since the wellbore diameter and the density of the sand-carrying fluid vary with the wellbore depth, the static stress $p_{wh}$ of the sand-carrying liquid column in wellbore and the fluid flow stress drop $\Delta p_{wf}$ in wellbore have to be calculated by subjecting the vertical depth and length of the wellbore separately to microelement calculation and integration; the bottom hole net pressure is calculated using the following formula:

$$p = p_h + \int_0^Z p_{wh} dz - \int_0^L \Delta p_{wf} dl - \Delta p_{pf} - \sigma_{hmin} \quad (11);$$

wherein p is the bottom hole net pressure, in Pa; $p_h$ is the wellhead stress, in Pa; $\sigma_{hmin}$ is the minimum horizontal principal stress of formation, in Pa.

4. The automatic diagnosis method for construction pressure curve of shale gas fracture network according to claim 1, wherein the bottom hole net pressure index fit value is calculated using the following formula:

$$n_i = \frac{(p_i - p_{i-1})(t_i - t_r)}{(t_i - t_{i-1})(p_i - p_r)}; \quad (12)$$

wherein n is the net pressure index fit value, no factor; p is the bottom hole net pressure, in Pa; t is the time, in s; subscript: i is a current bottom hole net pressure and a current time data number, no factor; r is a number of the reference bottom hole net pressure data and the reference time data, no factor;

the net pressure slope fit value is calculated using the following formula:

$$k_i = \frac{p_i - p_r}{(t_i - t_r)^{n_i}}; \tag{13}$$

wherein k is the net pressure slope fit value, in Pa/(s)$^e$;
the net pressure index average is calculated using the following formula:

$$\bar{n}_i = \frac{1}{t_i - t_r} \sum_{r+1}^{i} n_i(t_i - t_{i-1}); \tag{14}$$

wherein $\bar{n}$ is the net pressure index average, no factor;
the net pressure slope average is calculated using the following formula:

$$\bar{k}_i = \frac{1}{t_i - t_r} \sum_{r+1}^{i} k_i(t_i - t_{i-1}); \tag{15}$$

wherein $\bar{k}$ is the net pressure slope average, in Pa/(s)$^n$;
the net pressure index fit relative error value is calculated using the following formula:

$$\chi_i = \frac{\left| \bar{k}_i(t_i - t_r)^{n_i} - p_i \right|}{p_i} \times 100\%; \tag{16}$$

wherein $\chi$ is the net pressure index fit relative error value, no factor.

5. The automatic diagnosis method for construction pressure curve of shale gas fracture network according to claim 1, wherein a recognition equation for the fracture network extension mode is as follows:

$$\begin{cases} n > 0.3 \\ p > \min\left[ (\sigma_{nf} + S_{tnf}), \left( \sigma_{nf} - \frac{\tau_{nf} - \tau_o}{k_{nf}} \right) \right] - \sigma_{hmin} \end{cases}; \tag{17}$$

wherein:

$$\begin{cases} \sigma_{nf} = \sigma_{Hmax}\sin^2\theta_{nf}\sin^2\varphi_{nf} + \\ \sigma_{hmin}\cos^2\theta_{nf}\sin^2\varphi_{nf} + \sigma_v\cos^2\varphi_{nf} \\ \tau_{nf} = [(\sin\theta_{nf}\sin\varphi_{nf}\sigma_{Hmax})^2 + \\ (\cos\theta_{nf}\sin\varphi_{nf}\sigma_{hmin})^2 + (\cos\varphi_{nf}\sigma_v)^2 - \\ (\sigma_{Hmax}\sin^2\theta_{nf}\sin^2\varphi_{nf} + \\ \sigma_{hmin}\cos^2\theta_{nf}\sin^2\varphi_{nf} + \sigma_v\cos^2\varphi_{nf})^2]^{0.5} \end{cases}; \tag{18}$$

wherein $\sigma_v$ is a formation vertical stress, in Pa; $\sigma_{Hmax}$ is a formation maximum horizontal principal stress, in Pa; $\theta_{nf}$ is a formation natural fracture approach angle, in °; $\varphi_{nf}$ is a formation natural fracture inclination, in °; $S_{tnf}$ is a formation natural fracture tensile strength, in Pa; $\tau_o$ is a formation natural fracture cohesion, in Pa; $k_{nf}$ is a formation natural fracture friction coefficient, no factor; $\sigma_{nf}$ is a normal stress value withstood by the formation natural fracture wall surface, in Pa; $\sigma_\tau$ is a tangential stress value withstood by the formation natural fracture wall surface, in Pa; $\Delta S$ is a stress difference between the reservoir and the upper and lower compartments, in Pa;

a recognition equation for the extension resistance mode is as follows:

$$\begin{cases} n > 0.3 \\ p < \min\left[ (\sigma_{nf} + S_{tnf}), \left( \sigma_{nf} - \frac{\tau_{nf} - \tau_o}{k_{nf}} \right) \right] - \sigma_{hmin} \end{cases}; \tag{19}$$

a recognition equation for the normal extension mode is as follows:

$$\begin{cases} 0.2 < n < 0.3 \\ p > 0 \end{cases}; \tag{20}$$

a recognition equation for the bedding fracture extension mode is as follows:

$$\begin{cases} -0.2 < n < 0.2 \\ p > \sigma_v - \sigma_{hmin} + S_{tbp} \end{cases}; \tag{21}$$

wherein $S_{tnf}$ is a bedding fracture tensile strength, in Pa;
a recognition equation for the Fracture height extension mode is as follows:

$$\begin{cases} n < 0.2 \\ p > \Delta S \end{cases}; \tag{22}$$

a recognition equation for the rapid filtration mode is as follows:

$$\begin{cases} n < 0.2 \\ p < \Delta S \end{cases}. \tag{23}$$

* * * * *